G. VON ARCO & R. H. RENDAHL.
SELF INDUCTIVE MEANS FOR ELECTRICAL OSCILLATORY CIRCUITS.
APPLICATION FILED SEPT. 30, 1913.
1,131,187.
Patented Mar. 9, 1915.
2 SHEETS—SHEET 1.
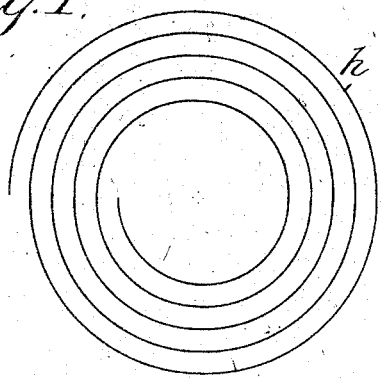
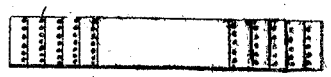
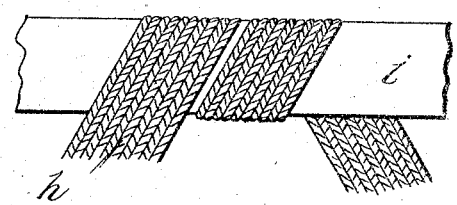
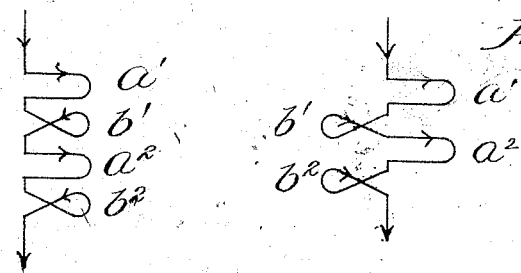
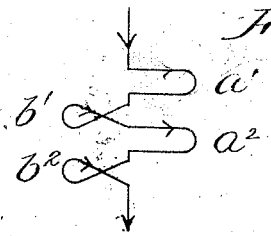
Witnesses:
Elsie Swenson
Ray J. Ernst
Inventors
Georg von Arco and Ragnar Hakan Rendahl
By their Attorneys G. VON ARCO & R. H. RENDAHL.
SELF INDUCTIVE MEANS FOR ELECTRICAL OSCILLATORY CIRCUITS.
APPLICATION FILED SEPT. 30, 1913.
1,131,187.
Patented Mar. 9, 1915.
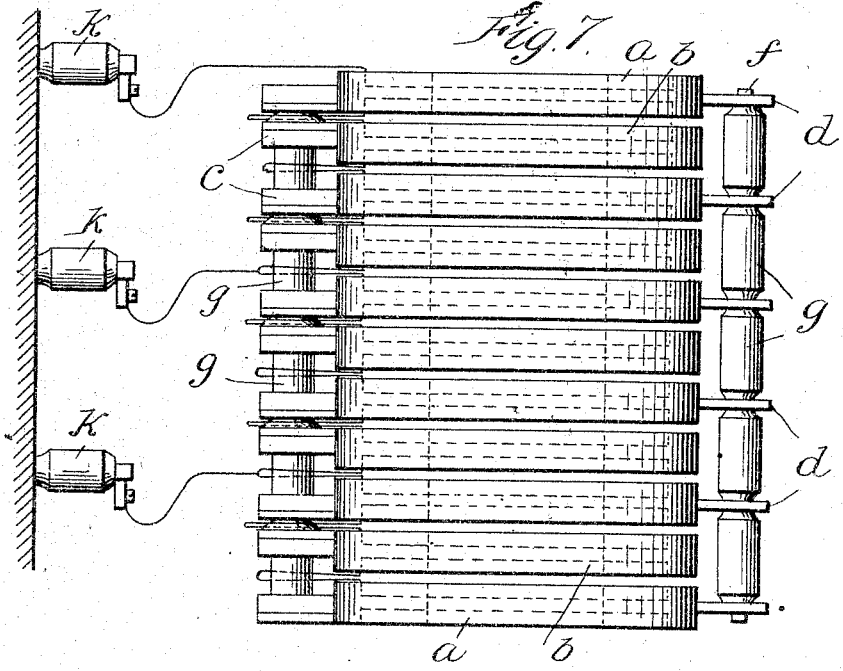
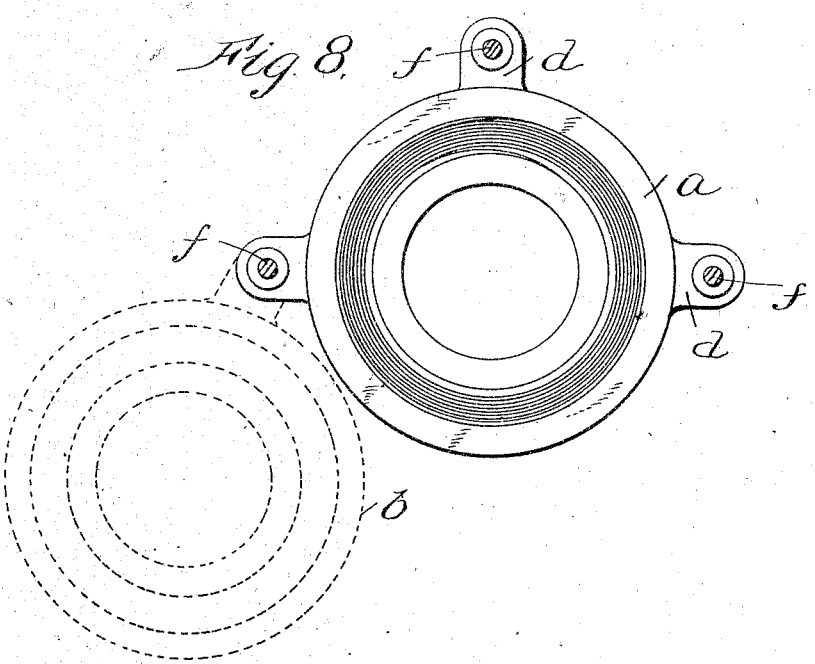

UNITED STATES PATENT OFFICE.

GEORG VON ARCO, OF BERLIN, GERMANY, AND RAGNAR HAKAN RENDAHL, OF LILIENHOLM, NEAR STOCKHOLM, SWEDEN.

SELF-INDUCTIVE MEANS FOR ELECTRICAL OSCILLATORY CIRCUITS.

1,131,187.　　　　　Specification of Letters Patent.　　Patented Mar. 9, 1915.

Original application filed January 29, 1910, Serial No. 540,914. Divided and this application filed September 30, 1913. Serial No. 792,682.

*To all whom it may concern:*

Be it known that we, GEORG VON ARCO and RAGNAR HAKAN RENDAHL, subjects of the German Emperor and the King of Sweden, respectively, and residing, respectively, at Berlin, Germany, and Lilienholm, near Stockholm, Sweden, have invented certain new and useful Improvements in Self-Inductive Means for Electrical Oscillatory Circuits, of which the following is a specification.

Our invention relates to self-inductive means for electrical oscillatory circuits, particularly for transmitting arrangements in wireless telegraphy, and the like, and the subject matter of the present invention constitutes a part of the subject matter contained in our co-pending application of similar title, Serial No. 540,914, filed January 29th, 1910, from which the present application has been divided.

The principal feature covered in aforesaid original application comprises substantially the forming of self-inductive coils as flat spirals and winding them out of special winding elements so that the convolutions of the spiral are all located in one plane.

The particular object of the invention covered by the present divisional application is to devise means by which a heavy current variometer composed of such winding elements can be used for practical purposes in high powered stations for radiating high frequency electric energy. The present invention shows how the coils disclosed in the original application may be united in any number to a variometer for the above purpose.

Some illustrative embodiments of our invention are represented diagrammatically in the accompanying drawings, wherein—

Figures 1 and 2 are top plan view and cross section, respectively, showing diagrammatically a coil formed as an annular disk. Figs. 3 and 4 are perspective views showing two forms of the winding elements in such coils. Figs. 5 and 6 are diagrams showing an arrangement of the coils for varying the self-induction within wide limits. Figs. 7 and 8 show a system of coils according to Figs. 5 and 6, assembled to form a variometer, Fig. 7 being an elevation and Fig. 8 a top plan view, in which the position of the movable coils when swung out, is represented by dotted lines.

Before describing the principal subject matter of the present invention, we shall shortly hereinafter refer to the winding of the coils as disclosed in our aforesaid original application. In said application it is stated that experiments have shown that the damping of coils, having the form of annular disks, is much less when the winding is sufficiently subdivided, than that of the best cylindrical coils. It has been proven by experiment that the least damping action is obtained when the internal diameter of such coils is approximately one half the external diameter. The height of the coils must be small relatively to this diameter. The conductors forming the coils are stranded together, and sufficiently insulated from each other to prevent the passage of Foucault current. The dimensions of the strands and their length are chosen so, as disclosed in said application, that a self-induction coil for high frequency currents is produced which will stand the heaviest possible load at minimum damping and maximum self-induction.

For winding the coils for heavy loads not one strand but a plurality of strands connected in parallel, is employed each of which is in turn stranded and consists of a large number of wires of at most 0.2 mm. diameter, insulated from each other for the reasons stated above, the main strands being so arranged that they form a flat ribbon $h$ as shown in Figs. 1 and 2. In this manner not only is a self-induction obtained which is a maximum for a given volume of coil and a given length of conductor but an exceedingly convenient arrangement of the coils is also produced.

Provision must be made that the individual strands as well as the individual conductors for the strands vary their positions in the magnetic field so that each conductor is subject to the same average strength of field. Also the well known tendency of high frequency currents to travel on the outermost surfaces of the conductor is counteracted by the alternation of the position of individual strands relatively to the ribbon center and by the fine subdivision of the strands into fine individual conductors. To obtain coils of this character a number of individual strands may be placed beside each other and suitably held together and the ribbon thus produced may be wound spirally around a flat ribbon-like support of insulating material. The winding element thus formed may now be used for any desired form of winding. Fig. 3 shows the manner in which such a winding element is produced. In this figure $h$ indicates a ribbon composed of ten strands connected in parallel and wound spirally around a strip of press-spahn, $i$.

Fig. 4 shows a ribbon $h$ made in a different manner. The strands are placed rectilinearly for a certain distance and they then change their position from time to time in such manner that for example the outermost strands are located in the center and the central ones at the outside. Such crossing may take place once in every convolution.

As will be readily understood from the herein described arrangement, to which a large number could be added, it is essential that the average distance of each of the individual strands from the center of the ribbon remains equal or approximately equal as has been clearly described and claimed in our aforesaid original application.

Variometers known heretofore in the art comprise individual coils which can be displaced relatively to each other in space. The variation of the self-induction obtained is larger the nearer all the windings of the coils can be brought together. Their proximity is limited only for mechanical reasons. These variometers, however, do not come into consideration for practical purposes for the transmitting circuit in wireless telegraph stations because it is impossible to bring the reciprocally movable parts between which considerable differences of potential exist, so near to each other that a suitable variation can be obtained. For whereas for example in a variometer for receiving circuits, a variation of the self induction of 1:17 can be conveniently obtained, it is practically impossible to construct a heavy current variometer for transmitting, capable of producing a variation of more than 1:2. For this reason, in spite of its undisputed advantages, the heavy current variometer has not been introduced in practice in wireless telegraphy.

The principal object of the invention forming the subject matter of the present application, is to overcome the above disadvantages.

According to our invention we distribute the entire self-induction among a plurality of small variometers connected in series. In this manner the tensions between the reciprocally movable parts of the individual variometers are diminished so that these parts can be brought nearer together and a greater possibility of variation results. Besides the range of variation of the arrangement is materially increased, by the individual variometers being formed as flat, superposed coils arranged in pairs, of which one coil of each pair is arranged fixed and the other movable to swing out from the system of coils parallel to the plane thereof. We will now explain this arrangement with reference to the diagrams Figs. 5 and 6. In Fig. 5 four coils are shown superposed, of which two, i. e., $a^1$, $a^2$, are fixed and the two others $b^1$, $b^2$ movable. The coils $a^1$, and $a^2$ are wound in one sense and the coils $b^1$ and $b^2$ in the other, so that the resultant self-induction of the arrangement in this position is zero. The arrows indicate the direction of current. In Fig. 6 the movable coils $b^1$, $b^2$ are swung out in such manner that their opposing influence is removed from the coils $a^1$, $a^2$. The result is that the total self-inductance of the variometer in this position is greater than the sum of the inductances of the individual variometers $a^1$, $b^1$ and $a^2$, $b^2$ if they were separated from each other but each in the position shown in Fig. 6 with its movable coil swung out. The explanation of this feature is that each variometer $a^1$, $b^1$ and $a^2$, $b^2$ when in the position shown in Fig. 6, and when removed from the other variometer has a certain maximum self-inductance. Now if the two variometers in this maximum position are assembled as shown in Fig. 6, their coils are in such position that all coils wound in the same sense inductively react upon each other ($a^1$ and $a^2$ and $b^1$ and $b^2$ react upon each other), in other words the certain maximum self-inductance of each variometer is increased by the reaction of the other variometer, so that the total of inductance produced by this arrangement is greater than the sum of the inductances of the individual variometers on account of the mutual inductance. Obviously the arrangement may be carried into practice with any desired number of variometers. Likewise, we may use a plurality of groups of movable coils.

In Figs. 7 and 8 $a$ designates fixed coils and $b$ movable coils of the form according to Figs. 1 and 2 wound from ribbons according to Fig. 3 for example. All the coils have eyes $c$ for receiving the pivotal axle on which the loose coils swing. The fixed coils $a$ have, in addition, eyes $d$, through which pins $f$ pass preventing the fixed coils from rotating on said axle. Insulators $g$ are arranged between the pairs of eyes $c$ and between the eyes $d$. If necessary, two or more movable coils may be connected mechanically together so that a large number of coils can be swung simultaneously. The arrangement is such that the fixed coils $a$ and movable coils *b* are arranged alternately in the system. As may be clearly seen from Fig. 7 any suitable number of variometers may be thrown into circuit by the connection with the desired binding post *k*.

What we claim is:

1. A high tension variometer for electrical oscillatory circuits comprising a plurality of fixed coils and a plurality of movable coils alternating with the fixed coils, all of said coils being in inductive relation to each other and all coils being connected electrically in series so that the drop in potential between two adjacent coils represents only a part of the whole drop in potential at the variometer, all of said movable coils being suitably connected to move together for varying the self-induction of the entire system of coils.

2. A high tension variometer for electrical oscillatory circuits comprising a plurality of fixed coils and a plurality of movable coils alternating with the fixed coils, all of said coils being in inductive relation to each other and all coils being connected electrically in series so that the drop in potential between two adjacent coils represents only a part of the whole drop in potential at the variometer, all of said movable coils being suitably connected to move together for varying the self-induction of the entire system of coils, each of said coils having the form of an annular disk.

3. A high tension variometer for electrical oscillatory circuits comprising a plurality of fixed coils and a plurality of movable coils alternating with the fixed coils, all of said coils being in inductive relation to each other and, all coils being connected electrically in series so that the drop in potential between two adjacent coils represents only a part of the whole drop in potential at the variometer, all of said movable coils being suitably connected to move together for varying the self-induction of the entire system of coils, each of said coils having the form of an annular disk, the inner diameter of each coil being substantially equal to one half of its outer diameter.

4. A high tension variometer for electrical oscillatory circuits, comprising a plurality of fixed coils and a plurality of movable coils alternating with the fixed coils, all of said coils being in inductive relation to each other, each of said coils having the form of a flat disk, all of said coils being connected electrically in series, the movable coils being wound to produce fields opposing those produced by their adjacent fixed coils, all of said movable coils being mechanically fixed together to permit their simultaneous removal from between the fixed coils for varying the self-induction, said movable coils being pivoted on an axis at right angles to the plane of the disks and disposed laterally thereof.

5. A high tension variometer for electrical oscillatory circuits, comprising a plurality of fixed coils and a plurality of movable coils, alternating with the fixed coils, and normally in axial alinement therewith, all of said coils being in inductive relation to each other and being electrically connected in series, the movable coils being wound to produce fields opposing those produced by their adjacent fixed coils, each pair of opposing adjacent movable and fixed coils forming an individual variometer, all of the movable coils being mechanically fixed together to permit their simultaneous removal from alinement with said fixed coils for varying the self-induction of the entire variometer, the maximum inductance of the entire variometer, with removed movable coils being larger than the sum of the inductances of the individual coils, and the minimum inductance of the entire variometer with all coils in alinement being substantially only equal to the sum of the inductances of the individual variometer with its pair of coils in axial alinement.

GEORG von ARCO.
RAGNAR HAKAN RENDAHL.

Witnesses:
WOLDEMAR HAUPT,
HADTWIG O. NEUBAUER.

Witnesses:
GRETA PRIM,
D. CARLSSON.